Dec. 15, 1959　　W. MELZER ET AL　　2,917,404
METHOD OF RENDERING POROUS GRAPHITE BODY IMPERVIOUS TO FLUIDS
Filed April 30, 1956

INVENTOR.
Wolfgang Melzer
BY Wilhelm Schuster
Michael S. Striker
Attorney

United States Patent Office 2,917,404
Patented Dec. 15, 1959

2,917,404

METHOD OF RENDERING POROUS GRAPHITE BODY IMPERVIOUS TO FLUIDS

Wolfgang Melzer and Wilhelm Schuster, Frankfurt am Main, Germany, assignors to Aktiengesellschaft Kuhnle, Kopp & Kausch, Frankenthal, Pfalz, Germany Application April 30, 1956, Serial No. 581,715

Claims priority, application Germany April 30, 1955

4 Claims. (Cl. 117—47)

The present invention relates to a method of rendering porous bodies impervious to fluid media (liquid or gaseous media), and more particularly the present invention relates to a method of sealing the pores of a porous graphite body so as to render the same impervious.

Graphite bodies in a variety of shapes such as tubes, crucibles and the like are preferably employed when resistance against chemical attack, good heat conductivity, good electrical conductivity or great resistance against the influence of changing temperatures or a combination of these qualities is required.

It is, however, a disadvantage of such bodies made of sintered graphite that they contain pores which frequently amount to between 15 and 25% of the entire volume of the sintered bodies.

It has already been attempted to impregnate bodies of sintered graphite with synthetic resins which were subsequently hardened in the pores of the sintered graphite body in order to make the same impervious to gases. However, this method is not only protracted and expensive, but it causes also the formation of a resin film on the surface of the sintered graphite body, which resin film has subsequently to be removed by machining in order to expose the graphite surface and to make effective use of the desired qualities of the graphite body. It is a further disadvantage of resin-treated sintered graphite bodies that the same are adversely affected by temperatures of about 170° C. or higher.

It is therefore an object of the present invention to overcome the aforementioned disadvantages of porous bodies produced with or without resin treatment.

It is a further object of the present invention to provide sintered graphite bodies which are impervious to fluid media and which can be produced in a quick and economical manner.

It is yet another object of the present invention to provide sintered graphite bodies and a method of making the same, which are impervious to fluid media and can be used at high temperatures, such as temperatures of up to 600° C. or more and which show great resistance against chemical attack.

Other objects and advantages of the present invention will become apparent from a further reading of the description and the appended claims.

With the above and other objects in view, the present invention comprises a method of sealing the pores of a porous body, comprising the steps of substantially filling the pores of the body with silicon tetrachloride (a liquid hydrolyzable silicon halide), hydrolyzing said silicon tetrachloride so as to form a silica gel in the pores, and converting the silica gel in the pores into silicon dioxide thereby sealing the pores and rendering the body impervious to fluid media.

The present invention also contemplates in a method of rendering a porous graphite body impervious to fluid media, the steps of immersing a body of particles of graphite sintered to each other, the body being porous due to the spaces formed between the sintered particles of graphite, into a bath of a liquid consisting substantially of $SiCl_4$, thereby substantially filling pores of the graphite body with $SiCl_4$, removing the graphite body from the bath of $SiCl_4$, subsequently immersing the graphite body having pores filled substantially with $SiCl_4$ into a bath of water so as to at least partly hydrolyze the $SiCl_4$, thereby forming a silica gel in pores of the graphite body, removing the graphite body from the bath of water, thereafter preheating the graphite body to about 100° C. for a period of time sufficient to complete the hydrolyzation of said $SiCl_4$ and formation of silica gel in pores of said graphite body, and heating the preheated graphite body having the thus formed silica gel embedded in pores thereof to a temperature of between 100° C. and 500° C. for a period of time sufficient to convert the silica gel into silicon dioxide which seals the pores and renders the same impervious to fluid media.

The present invention also comprises as a new article of manufacture, a shaped body consisting essentially of particles of graphite sintered to each other, the body being porous due to the spaces formed between the sintered particles of graphite, and of silicon dioxide at least partially filling the pores in the graphite body thereby rendering the same impervious to fluid media.

Thus, according to the present invention, the pores of bodies made of sintered graphite, i.e. of particles of graphite sintered to each other and being porous due to the spaces formed between the sintered particles of graphite, are first filled with a liquid silicon-containing compound which is adapted to be hydrolyzed under formation of silica gel.

The hydrolyzable silicon compound $SiCl_4$, after having penetrated into the pores of the porous body and particularly into the pores of a porous sintered graphite body is then hydrolyzed while in these pores by being contacted with water. This may be effected for instance by immersing the sintered graphite body with the hydrolyzable silicon compound contained in its pores into water, or by exposing the porous graphite body to water vapors by placing the same into an atmosphere containing a high degree of humidity, preferably being saturated or oversaturated with water vapors.

Silicon tetrachloride is thereby hydrolyzed according to the formula:

$$SiCl_4 + 4H_2O = Si(OH)_4 + 4HCl$$

It must be noted, however, that the $SiO_2$ is then present in hydrated gel form.

The silicon gel now contained in the pores of the sintered graphite body, after the originally present $SiCl_4$ has been hydrolyzed, is then heated in order to lose water and to change from the hydrated gel form into solid $SiO_2$ according to the formula $Si(OH)_4 = SiO_2 + 2H_2O$. This $SiO_2$ closes the pores and renders the entire sintered graphite body impervious to fluid media. $SiCl_4$ is characterized by its high mobility and ability to form molecular dispersions. The dry porous sintered graphite body adsorbs the liquid silicon chloride compound by capillary action somewhat similar to the adsorption of water by a sponge. It is therefore quite simple to achieve substantially complete filling of the pores of a sintered graphite body with $SiCl_4$. Hydrolyzation of the $SiCl_4$ in the pores of the graphite body and formation of the silica gel therein is then accomplished by contacting the graphite body with water or by placing the graphite body into a moist atmosphere.

According to a preferred execution of the method of the present invention, the individual steps of filling pores of a graphite body with $SiCl_4$, hydrolyzing and converting the thus-formed silica gel into $SiO_2$ may be repeated either in sequence, or individual steps may be repeated prior to performing the next step of the method. For instance, excellent results have been obtained by first repeating the step of contacting the graphite body with the liquid silicon chloride compound between one and five times, most preferably twice, and thereafter hydrolyzing the liquid silicon chloride compound in the pores of the graphite body. Excellent results have also been obtained by first contacting the graphite body with the liquid silicon chloride compound so as to fill a portion of the pores of the graphite body, thereafter hydrolyzing the silicon chloride compound in the pores of the graphite body, and repeating these two steps in sequence until substantially all, or a number of pores sufficient to render the graphite body impervious to gases, have been filled with silica gel which is subsequently converted into solid dry $SiO_2$.

It has been found that the method of the present invention gives excellent results with sintered graphite bodies of varying pore diameter and varying pore volume, as well as varying configuration and wall thickness. Depending on the specific physical characteristics of the porous sintered graphite body, the method of the present invention is to be executed with or without repeating some or all of the individual steps thereof, preferably between one and five times.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
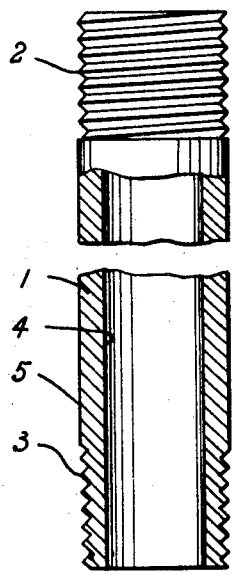
Fig. 1 shows a shaped graphite body in a fragmentary elevational view, partially in cross-section.

Referring now to the drawings, and particularly to Fig. 1, a body made of sintered graphite in the shape of a tube 1 is shown. Tube 1 is provided with external screw threads 2 and 3 on both of its ends. Penetration of the pores of tube 1 with $SiCl_4$, is accomplished from its outer wall 5 as well as from its inner wall 4.

Figure 2:
Fig. 2 is an enlarged cross-sectional view of a small portion of the body illustrated in Fig. 1.

An enlarged section through the wall of tube 1 is shown in schematic Fig. 2. It can be seen that the wall of tube 1 consists of graphite particles 10 which are sintered together, and silicon dioxide 11 sealing the spaces between sintered particles 10.

Figure 3:
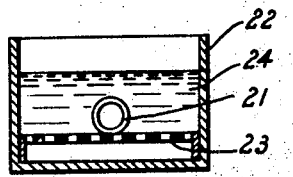
Fig. 3 is a schematic view partially in cross-section of a device for contacting a porous body with a liquid silicon chloride compound according to the present invention.

A simple apparatus for immersing a graphite body in a liquid silicon compound is shown in Fig. 3. A porous graphite body in the shape of tube 21 rests inside container 22 supported by grating 23. Container 22 is filled with silicon tetrachloride 24 to a level above tube 21. Tube 21 adsorbs silicon tetrachloride into its pores throughout its entire surface since it is surrounded on all sides by the liquid silicon tetrachloride 24.

Figure 4:
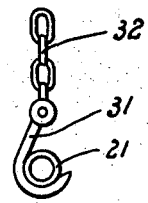
Fig. 4 is a fragmentary view of a holding device adapted to hold a graphite body while excess liquid silicon chloride compound is removed therefrom.

After immersing tube 21 for instance for about 10 minutes in silicon tetrachloride, the tube is removed from the silicon tetrachloride bath by a plurality of chain hooks such as illustrated in Fig. 4. Tube 21 rests in hook 31 which is suspended from chain 32. Thereby it is achieved that the surface of tube 21 is substantially exposed to the atmosphere so that surplus silicon tetrachloride will drop off and also will evaporate from the surface of tube 21, thus preventing the formation of a skin layer of silica gel, or silicon dioxide during the further treatment of tube 21. Only the silica tetrachloride adsorbed into the pores of tube 21 by capillary action is retained.

Figure 5:
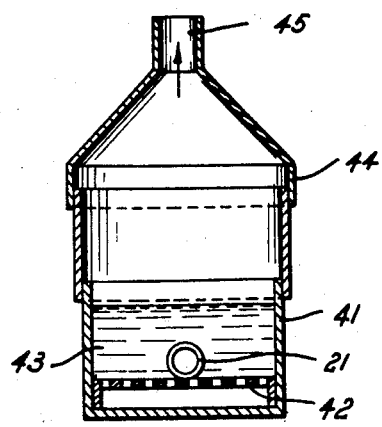
Fig. 5 is a schematic view partly in cross-section of an apparatus for hydrolyzing the silicon chloride compound contained in the graphite body.

Figure 5 is a schematic illustration of an apparatus for hydrolyzing silicon tetrachloride in the pores of tube 21. Container 41 is filled with water 43. Tube 21 rests immersed in water 43 on grating 42. Hydrochloric acid formed by hydrolyzation of silicon tetrachloride escapes through hood 44 into vent 45.

Silicon tetrachloride is not an aggressive chemical and therefore no special precautions have to be taken with respect to the materials and structural parts which come in contact with it. However, in order to prevent the corrosive action of hydrochloric acid it is advisable to make or to line structural parts which may come in contact with hydrochloric acid of or by an acid-resistant material such as a steel containing about 18% chromium, 8% nickel and 2% molybdenum.

Figure 6:
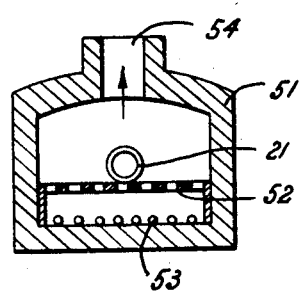
Fig. 6 is a schematic view, partially in cross-section, of a device for transforming silica gel in the pores of a graphite body into solid, dry $SiO_2$.

The tunnel kiln shown in Fig. 6 serves for the subsequent heating of the silica gel-containing graphite body first to about 100° C. for completing the hydrolyzation of the silicon tetrachloride, and subsequently to up to 500° C., preferably to about 350° C. for converting the silica gel into dry solid silicon dioxide. Kiln 51 is provided with grating 52 beneath which are arranged electrical heating elements 53 connected to suitable electrical conduits and temperature control devices (not shown). Residual hydrochloric acid vapors escape through vent 54.

The following example is given as illustrative only, the present invention, however, not being limited to the specific details of the example.

*Example*

A tubular body made of sintered graphite and having a wall thickness of about 5 millimeters is dried so as to be free of moisture. It is then immersed for about 10 minutes into silicon tetrachloride and thereafter removed from the bath of silicon tetrachloride. Upon exposure to the atmosphere at room temperature, silicon tetrachloride quickly evaporates from the surface of the tubular body, while the silicon tetrachloride adsorbed into the pores of the tubular body remains therein. Thereafter the tubular body is immersed in water for about 15 minutes in order to hydrolyze the silicon tetrachloride in the pores thereof. The tubular body is then removed from the water bath and heated for about 15 minutes to about 100° C. in order to complete the hydrolysis of the silicon tetrachloride and to evaporate the liberated hydrochloric acid. Subsequently, the tubular body is heated to a temperature between 100 and 500° C., in the present case to about 350° C., at which temperature the silica gel in the pores of the tubular body is converted into solid dry silicon dioxide, while water escapes therefrom.

The thus obtained tubular body is already impervious to gases having an over-pressure of one atmosphere. Repetition of the entire treatment or of the immersion of the tubular body in silicon tetrachloride with or without also repeating any subsequent steps prior to again immersing the tubular body in silicon tetrachloride, will make the tubular body impervious to air at an over-pressure of 5 atmospheres. The thus treated tubular body proved resistant against temperatures of up to 600° C. in a non-oxidizing atmosphere, and also proved resistant against hydrochloric acid of any desired concentration at temperatures up to 600° C., and also against boiling sulfuric acid concentrated up to about 80%.

The above example refers to a sintered graphite body having a wall thickness of about 5 millimeters. Good results were also obtained by following the procedure described in the example with a sintered graphite body having a wall thickness of about 8 millimeters. The apparatus illustrated in the drawing was used for the example.

Certain modifications as to the length of time required for the individual treatment steps, the drying temperature, and the repetition of some of the treatment steps depend on the desired end result, e.g. the degree of over-pressure at which the body must remain impervious to gases, and also on the physical characteristics of the sintered graphite body as well as its shape. Generally the entire volume of the pores in the sintered graphite body amounts to about between 15 and 25% of the total volume of the sintered graphite body. At wall thicknesses of about 5 millimeters, the time period for immersion in silicon tetrachloride will preferably be between 5 and 10 minutes. When sintered graphite bodies of greater wall thickness are to be treated, as a general rule the time period for immersion in silicon tetrachloride will increase with the square of the wall thickness.

Similarly the length of time for which the sintered graphite body with the silicon tetrachloride in its pores has to be treated with water in order to hydrolyze the silicon tetrachloride will increase approximately with the square of the thickness of the wall of the graphite body, whereby for a wall thickness of about 5 to 8 millimeters a water treating time of about 15 minutes will be required.

The preheating to about 100° C. which will require about 10 minutes when the wall thickness of the graphite body is about 5 to 8 millimeters, will have to be extended for longer periods of time in approximate proportion to the wall thickness of the graphite body when the same is thicker than 8 millimeters.

Converting the silica gel in the pores into dry solid silicon dioxide at a temperature of about 300° C. will require about one to five hours with respect to sintered graphite bodies having a thickness of between about 5 and 8 millimeters. In the case of sintered graphite bodies of greater thickness, heating time is to be increased in proportion to the increased wall thickness. The heating time will be somewhat reduced when temperatures in excess of 300° C., up to about 500° C. are applied.

Sintered graphite bodies made gas-impermeable according to the method of the present invention are excellently suited for use in the production and application of hydrochloric acid, for concentrating and using sulfuric acid as well as for all other purposes where the characteristics of a sintered graphite body are required in combination with imperviousness to gases and where no chemical attack to $SiO_2$ is possible.

It will be understood that each of the elements described above, or two or more together, may also find a useful application in other types of gas-impervious porous bodies differing from the types described above.

While the invention has been illustrated and described as embodied in gas-impervious shaped bodies consisting essentially of particles of graphite sintered to each other and made impervious to gases by silicon dioxide sealing the pores thereof, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of rendering a porous graphite body impervious to fluid media, comprising the steps of drying said porous graphite body; immersing said dry graphite body into $SiCl_4$ in the absence of water so as to prevent hydrolyzation of said $SiCl_4$ until at least a major portion of the pores of said graphite body are substantially filled with said $SiCl_4$; removing said graphite body from said $SiCl_4$; thereafter treating said water-free graphite body having the pores thereof substantially filled with $SiCl_4$ with water so as to hydrolyze said $SiCl_4$, thereby forming a silica gel in the pores of said graphite body; and heating said graphite body having the thus formed silica gel embedded in pores thereof to a temperature of between 100° C. and 500° C. for a period of time sufficient to convert said silica gel into silicon dioxide which seals said pores and renders said body impervious to fluid media.

2. A method of rendering a porous graphite body impervious to fluid media, comprising the steps of drying said porous graphite body; immersing said dry graphite body into $SiCl_4$ in the absence of water so as to prevent hydrolyzation of said $SiCl_4$ until at least a major portion of the pores of said graphite body are substantially filled with said $SiCl_4$; removing said graphite body from said $SiCl_4$; thereafter treating said water-free graphite body having the pores thereof substantially filled with $SiCl_4$ with water so as to hydrolyze said $SiCl_4$, thereby forming a silica gel in the pores of said graphite body; and heating said graphite body having the thus formed silica gel embedded in pores thereof to a temperature of approximately 350° C. for a period of time sufficient to convert said silica gel into silicon dioxide which seals said pores and renders said body impervious to fluid media.

3. In a method of rendering a porous graphite body impervious to fluid media, the steps of immersing a dry body of particles of graphite sintered to each other, said body being porous due to the spaces formed between said sintered particles of graphite, into a bath of $SiCl_4$ in the absence of water so as to prevent hydrolyzation of said $SiCl_4$, thereby substantially filling substantially all of the pores of said graphite body with $SiCl_4$; removing said graphite body from said bath of $SiCl_4$; subsequently immersing said water-free graphite body having its pores filled substantially with $SiCl_4$ into a bath of water so as to at least partly hydrolyze said $SiCl_4$, thereby forming a silica gel in pores of said graphite body; removing said graphite body from said bath of water; thereafter preheating said graphite body to about 100° C. for a period of time sufficient to complete the hydrolyzation of said $SiCl_4$ and formation of silica gel in pores of said graphite body; and heating said preheated graphite body having the thus formed silica gel embedded in pores thereof to a temperature of between 100° C. and 500° C. for a period of time sufficient to convert said silica gel into silicon dioxide which seals said pores and renders the same impervious to fluid media.

4. A method of rendering a porous graphite body impervious to fluid media in which the steps recited in claim 3 are repeated until said porous graphite body is rendered impervious to fluid media.

References Cited in the file of this patent

UNITED STATES PATENTS

| | | |
|---|---|---|
| 1,322,491 | King | Nov. 18, 1919 |
| 1,492,302 | MacMillan | Apr. 29, 1924 |
| 1,620,940 | Bleecker | Mar. 15, 1927 |
| 1,694,730 | Bleecker | Dec. 11, 1928 |
| 1,856,680 | Williams et al. | May 3, 1932 |
| 1,991,487 | Bemis | Feb. 19, 1935 |
| 2,074,885 | Bender | Mar. 23, 1937 |
| 2,216,493 | Kiefer | Oct. 1, 1940 |
| 2,383,653 | Kirk | Aug. 28, 1945 |
| 2,394,040 | Callinan | Feb. 6, 1946 |

FOREIGN PATENTS

| | | |
|---|---|---|
| 260,031 | Great Britain | Oct. 18, 1926 |